United States Patent [19]

Smith et al.

[11] 4,317,279
[45] Mar. 2, 1982

[54] COAXIAL CABLE TRIMMER

[75] Inventors: Robert R. Smith, Garland; Guy H. Tippit, Greenville, both of Tex.

[73] Assignee: E-Systems, Inc., Dallas, Tex.

[21] Appl. No.: 68,342

[22] Filed: Aug. 21, 1979

[51] Int. Cl.³ ............................................. B21F 13/00
[52] U.S. Cl. ........................................ 30/90.1; 30/94; 144/3 R; 81/9.5 R
[58] Field of Search ................... 30/124, 90.1, 276, 93, 30/94, 95, 96; 83/862; 81/9.5 R, 9.51; 144/3 R, 326 R

[56] References Cited

U.S. PATENT DOCUMENTS

| | | | |
|---|---|---|---|
| 2,377,888 | 6/1945 | King | 30/124 |
| 3,533,313 | 10/1970 | Matthews | 81/9.5 R |
| 3,566,466 | 3/1971 | Matthews | 30/90.1 |
| 3,596,540 | 8/1971 | Hooper | 81/9.5 A |
| 3,620,104 | 11/1971 | Horrocks | 30/90.1 |

FOREIGN PATENT DOCUMENTS

| | | | |
|---|---|---|---|
| 123507 | 2/1947 | Australia | 81/9.51 |
| 219112 | 6/1961 | Austria | 30/90.1 |
| 1913438 | 11/1969 | Fed. Rep. of Germany | 81/9.5 R |
| 2313125 | 9/1974 | Fed. Rep. of Germany | 81/9.5 R |

*Primary Examiner*—James L. Jones, Jr.
*Attorney, Agent, or Firm*—Robert V. Wilder; Albert M. Crowder, Jr

[57] ABSTRACT

A portable coaxial cable trimmer (10) for trimming coaxial cable (12) with shielding (36), insulation (38), and a conductor (40) comprises a hollow, elongated housing (18) with a laterally disposed port (44). A first bushing (22) is attached to the end of the housing (18) for centering the cable (12). A first cutter (30) is secured in the housing (18) for trimming the insulation (38) and shielding (36) to produce a shaving (42) which is discharged from the housing (18) through a port (44). A second bushing (46), secured in the housing (18), centers the exposed conductor (40) of the trimmed cable (12). A second cutter (48) disposed in the housing (18) rounds and cuts the end of the exposed conductor (40). A device for rotating the housing, such as an air drill or an electric drill (14) can be attached to the cable trimmer (10) for rotating the housing (18) with respect to the cable (12).

6 Claims, 8 Drawing Figures

COAXIAL CABLE TRIMMER

TECHNICAL FIELD

This invention relates to cable trimmers for trimming the ends of cables, and more particularly, to coaxial cable end trimming tools.

BACKGROUND ART

In a coaxial cable, a shield forms the outer sheath of the cable and usually surrounds a foam type insulation with a conductor running through the middle of the cable. The end of a coaxial cable is inserted in a fitting (connector) for use in completing electrical connections. In order to insert the end of the cable in the fitting, it must be properly trimmed.

Prior devices and methods have not been entirely satisfactory in trimming the ends of a coaxial cable. Previous workers in the field have employed razor blade knives and tubing cutters to perform the trimming operation. These tools require considerable hand labor and skill in operation. The task is very painstaking and requires much time. Of equal importance, it results in a great waste of material because mistakes are frequent and the end of the cable must be cut off and discarded after each mistake. Further, the trimming can only be performed under favorable working conditions, such as on a workbench, because the cable must be held firmly in order to be accurately cut. Since prior art devices require a steady worktable, coaxial cable cannot be easily repaired on the job site.

Prior methods and devices for trimming the ends of coaxial cable frequently contaminate the insulation with bits of metal from the conductor. This contamination is undesirable because it degrades the performance of the cable.

SUMMARY OF THE INVENTION

In accordance with the present invention, a device for trimming coaxial cable having a conductor, shielding, and insulation comprises a housing for supporting the cable in a substantially straight position. A first cutter disposed in the housing cuts the shielding and insulation, while a second cutter cuts the conductor. A means, connected to the housing, rotates the housing during the cutting operation.

In accordance with another aspect of the invention, a device for trimming coaxial cable having shielding, insulation and a conductor comprises a hollow, elongated housing with a port laterally disposed on the housing and supporting the cable. An aligning means is secured in the housing for centering the cable in the housing. A first cutter is secured in the housing for cutting the insulation and the shielding. A second cutter is secured in the housing for cutting the conductor. A means is provided for rotating the housing during the cutting operation.

In accordance with yet another aspect of the invention, a cable trimmer for trimming coaxial cable having insulation, shielding, and a conductor comprises a hollow, elongated housing with first and second open ends and a laterally disposed port. A first cutter is secured in the housing for exposing the conductor in the cable by trimming the insulation and the shielding to produce a shaving. The shaving is discharged from the housing through the port. A bushing is adjustably positioned in the housing for centering the exposed conductor in the housing. A second cutter, adjustably disposed in the housing, cuts the exposed conductor. A means is provided for rotating the housing during the cutting operation.

BRIEF DESCRIPTION OF THE DRAWINGS

For a more complete understanding of the present invention and the advantages thereof, reference is now made to the following detailed description taken in conjunction with the accompanying drawings in which.

DETAILED DESCRIPTION

Figure 1:
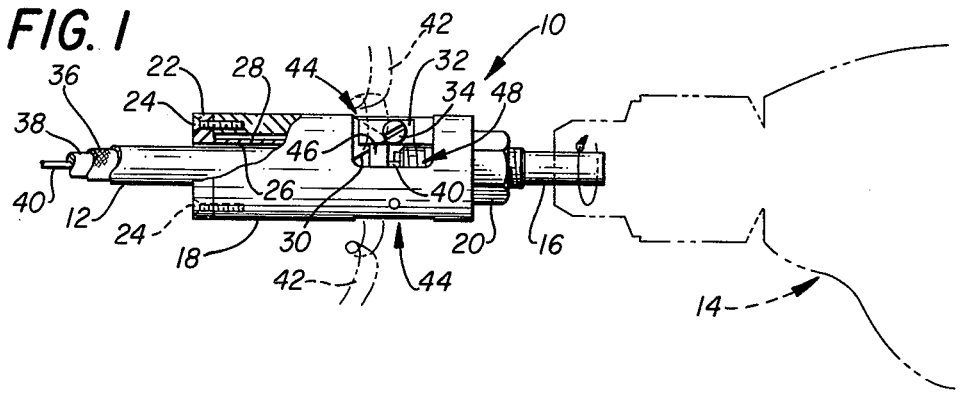
FIG. 1 is a perspective cutaway drawing of the present invention in use.

Referring to FIGS. 1 through 6, a cable trimmer 10 for trimming a coaxial cable 12 is powered by a convenient source of rotative power, such as an air or electric drill 14 through a chuck gripping a shaft 16. The shaft 16 threads into the end of a housing 18, and a locknut 20 prevents the shaft 16 from rotating within the housing 18 once the shaft 16 has been set.

The cable 12 is inserted in the cable trimmer 10 through a first bushing 22. The bushing 22, secured in the housing 18 by screws 24, has a cylindrical portion 26. The cylindrical portion 26 of the first bushing 22 opens into a bore 28 that extends into the housing 18. The cylindrical portion 26 holds the cable 12 in a straight position of the housing 18 and aligns it for a pair of cutting blades 30. The cylindrical portion 26 protects the cable 12 from damage by the housing 18 which can occur during operation.

The cutting blades 30, held in the housing 18 by clamps 32 and screws 34, trim the shielding 36 and insulation 38 of the cable 12 to expose the conductor 40. The trimmed shielding 36 and insulation 38 form a shaving 42 (shown in phantom) which is expelled from the housing 18 through one of a pair of ports 44.

The exposed conductor 40 passes through a second bushing 46 which aligns it for a conductor trimmer 48. The conductor trimmer 48 rounds the end of the conductor 40, thereby preparing it for insertion in a connector (not shown).

Figure 2:
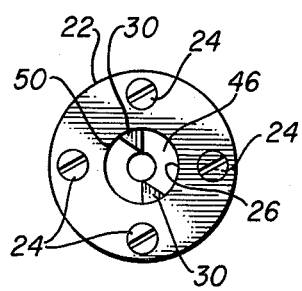
FIG. 2 is an end view of the present invention.

Referring to FIG. 2, there is shown an end view of the cable trimmer 10. Four screws 24, positioned in holes in the first bushing 22, secure the first bushing 22 to the end of the housing 18. An aperture 50 in the bushing 22, permitting the cable 12 to fit in the cylindrical portion 26, can be made in different diameters to accommodate different sizes of coaxial cable, such as ¼ inch, ⅜ inch, or ½ inch coaxial cable. The cutting blades 30 and second bushing 46 are visible through the aperture 50 in the first bushing 22.

Figure 3:
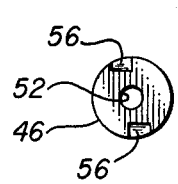
FIG. 3 is a front view of the second bushing in the present invention.
Figure 4:
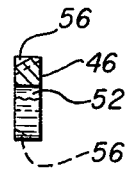
FIG. 4 is a side view of the second bushing in FIG. 3, with channels and an aperture indicated in phantom.
Figure 6:
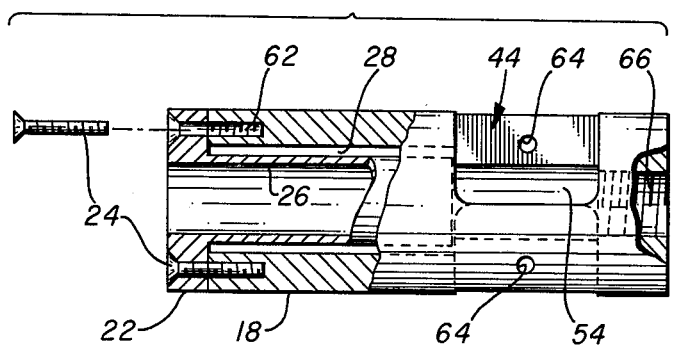
FIG. 6 is a view of the housing of the present invention.

The construction of the second bushing 46 is shown in FIGS. 3-4. An aperture 52 is formed in the center of the bushing 46 and has a diameter permitting the free passage of the exposed conductor 40. The second bushing 46 is of sufficient length to hold the exposed conductor 40 securely so that the conductor trimmer 48 can trim the conductor 40. Referring to FIG. 6, the diameter of the bushing 46 is dimensioned to fit snugly in the bore 54 of the housing 18.

Channels 56 are formed in the second bushing 46, and form a 30° angle with the edge of the bushing. The channels 56 are offset with respect to a center line passing through the aperture 52 to receive the cutting blades 30 mounted in the ports 44.

The channels 56 can be of different depths, depending upon the diameter of the cable 12 for which the cable trimmer 10 is designed. If the cable 12 has a large diameter, such as ½ inch, the channels 56 have a lesser depth than in the case when the cable 12 has a smaller diameter, such as ¼ inch. The dotted lines in FIG. 4 indicate two possible depths of the channels 56. Each depth of the channels 56 corresponds to a different diameter cable 12 for which the cable trimmer 10 can be designed to trim.

Since the cutting blades 30 fit into the channels 56, the second bushing 46 is positioned very close to the cutting edge. The cable 12 can thus be trimmed with only a short length of the conductor 40 exposed.

Figure 5:
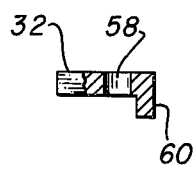
FIG. 5 is a side view of the clamp used in the present invention.

FIG. 5 shows the clamp 32 in a side view. The clamp 32 is generally L-shaped, with a hole 58 drilled through it to accommodate the screw 34 which holds the clamp 32 in the housing 18. The cutting blade 30 fits under the clamp 32, so the shorter end 60 of the clamp 32 is slightly shorter in length than the thickness of the blade 30.

The construction of the housing 18 is to be seen in FIG. 6. The housing 18 has holes 62 drilled therein to accommodate the screws 24 which secure the first bushing 22 thereto. The bore 28 is cut along the longitudinal axis of the housing 18 with the appropriate length and diameter to accommodate the cylindrical portion 26 of the bushing 22. The twin ports 44 are formed on the lateral side of the housing 18, diametrically opposite each other. The hole 64 accepts the screw 34 which holds the clamp 32 in the housing 18. The longitudinal bore 54 in the housing 18 has a smaller diameter than the bore 28, and is of the same length as the port 44. The bore 54 connects to the longitudinal bore 66, which is threaded to accept the shaft 16.

Figure 7:
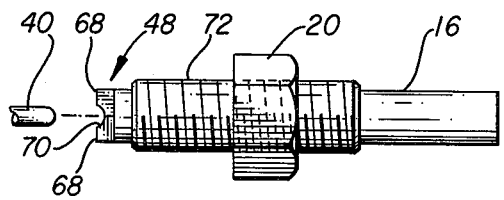
FIG. 7 is a side view of the second cutting means of the present invention.
Figure 8:
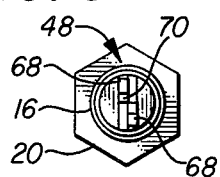
FIG. 8 is an end view of the second cutting means of the present invention.

The construction of the conductor trimmer 48 is shown in FIGS. 7 and 8. The conductor trimmer 48 is composed of two symmetrical cutting edges 68 which are silver-soldered onto the end of the shaft 16. The cutting edges 68 have rounded edges 70. When attached to the shaft 16, the rounded edges 70 form a cutting edge which rounds the end of the conductor 40, i.e., the end of the conductor 40 is in the shape of a hemisphere after the operation of the cable trimmer 10.

The shaft 16 has threads 72 which permit the shaft 16 to thread into the housing 18. The locknut 20 also threads onto the threads 72.

The attachment of the cutting edges 68 to the shaft 16 is best illustrated in FIG. 8. The cutting edges 68 are silver-soldered to the end of the shaft 16 in a staggered position, i.e., the cutting edges 68 are laterally offset from each other on the end of the shaft 16.

In operation, the cable trimmer 10 is attached to a drill 14 by inserting the shaft 16 into a chuck attached to a rotator, such as a drill 14. The length of the conductor 40, which is to extend from the cable 12, is set by positioning the shaft 16 in the housing 18. The locknut 20 is tightened against the housing 18 to prevent the shaft 16 from rotating during the operation of the cable trimmer 10. The cable 12 is inserted through the aperture 50 of the bushing 22, and the drill 14 is actuated to rotate the housing 18. The shielding 36 and insulation 38 of the cable 12 are cut as they pass the cutting blades 30 in the housing 18, thereby exposing the conductor 40 of the cable 12. The second bushing 46 aligns the exposed conductor 40 with the conductor trimmer 48 which rounds the end of the conductor 40. The shaving 42, formed by the insulation 38 and shielding 36 of the cable 12, is discharged through the port 44 along with the filings from the conductor 40. The trimmed cable 12, when removed from the cable trimmer 10, is ready to be inserted in a connector.

Since the insulation 38 is trimmed separately from the conductor 40, no shavings from the conductor 40 are embedded in the insulation 38 of the cable 12 to degrade the performance of the cable 12.

The cable trimmer 10 is constructed to accommodate different sizes of coaxial cable by modifying only two of its component parts, the first bushing 22 and the second bushing 46. Only the diameter of the aperture 50 in the bushing 22 needs to be modified to accommodate different diameter cables. As to bushing 46, aperture 52 must be increased or decreased in diameter to accommodate different diameter conductors 40. The channels 56 in the bushing 46 are modified, as hereinbefore described, to accommodate different diameter cables.

Since only the bushings 22 and 46 need to be changed is modifying the cable trimmer 10 to accept different sized cables, the other component parts of the cable trimmer 10 are standardized. Thus, any cable trimmer 10 can be modified to accept another size cable by installing the appropriate bushings 22, 46 and by adjusting the cutting blades 30.

The rotator can be any suitable source of rotational power such as an electric or air drill, or even hand power, and the cable trimmer 10 will operate as hereinbefore described, as will be evident to those of skill in the art.

It is to be noted that the cable trimmer 10 can be easily used on the job site. The cable trimmer 10 does not require a steady worktable or other supporting device. The rotator can be a suitable hand brace, so the cable trimmer 10 can be used in remote locations, such as on aircraft.

While a preferred embodiment of the invention has been set forth for purposes of disclosure, further embodiments of the invention as well as modifications to the disclosed embodiment which do not depart from the spirit and scope of the invention may occur to those skilled in the art. Accordingly, the claims are intended to cover all embodiments and modifications of the invention which do not depart from the spirit and scope of the invention.

We claim:

1. Apparatus for trimming coaxial cable having a conductor, shielding, and insulation comprising:

housing means for supporting the cable in a substantially straight position;

means for rotating said housing relative to the cable, said means for rotating including connecting shaft means adjustably secured in said housing means for attachment to a drive;

first cutting means disposed in said housing means for cutting the shielding and the insulation; and second cutting means attached to said connecting shaft means and disposed in said housing means for cutting the conductor.

2. The apparatus of claim 1 and further comprising aligning means disposed in said housing means for aligning the conductor with said second cutting means.

3. The apparatus of claim 2 wherein a second aligning means is disposed in said housing means and aligns the cable with said first cutting means.

4. Apparatus for trimming coaxial cable having shielding, insulation, and a conductor comprising:
   hollow, elongated housing means for supporting the cable therein;
   first cutting means secured in said housing means for cutting the insulation and the shielding and exposing the conductor;
   aligning means secured in said housing means for centering the exposed conductor in said housing means;
   a shaft adjustably secured in said housing means;
   second cutting means secured to said shaft in said housing means for cutting the conductor; and
   means for rotating said housing means relative to the cable.

5. A cable trimmer for trimming coaxial cable having insulation, shielding, and a conductor comprising:
   a hollow, elongated housing with first and second open ends and a laterally disposed port;
   a first cutter secured in said housing for exposing the conductor in the cable by trimming the insulation and shielding to produce a shaving, said shaving being discharged from said housing through said port;
   a bushing adjustably positioned in said housing for centering the exposed conductor in said housing;
   a shaft threaded into the second end of said housing;
   a second cutter attached to said shaft and disposed in said housing for cutting the exposed conductor; and
   means for rotating said housing with respect to the cable.

6. The cable trimmer in claim 5 and further comprising a second bushing attached to the first end of said housing for centering the cable in said housing.

* * * * *